United States Patent [19]

Buckley et al.

[11] Patent Number: 4,707,712

[45] Date of Patent: Nov. 17, 1987

[54] METHOD AND APPARATUS FOR TRANSPORTING AND TENSIONING SHEET MATERIALS IN AN INK JET PRINTER

[75] Inventors: Dennis J. Buckley, Nashua; Arthur Cleary, Derry, both of N.H.; Calvin Winey, Tewksbury, Mass.

[73] Assignee: Advanced Color Technology, Inc., Cambridge, Mass.

[21] Appl. No.: 861,263

[22] Filed: May 9, 1986

[51] Int. Cl.$^4$ ........................ G01D 15/24; G03G 15/00

[52] U.S. Cl. ................................ 346/136; 346/140 R; 355/3 DR; 355/14 D

[58] Field of Search .................... 355/3 DR, 16, 14 D; 346/136, 137, 138, 140, 1.1; 242/67.3

[56] References Cited

U.S. PATENT DOCUMENTS

| | | | |
|---|---|---|---|
| 3,829,208 | 8/1974 | van Meijel et al. | 355/3 DR |
| 3,974,974 | 8/1976 | Nishikawa | 355/16 X |
| 4,102,570 | 7/1978 | Shimoda | 355/3 DR X |

OTHER PUBLICATIONS

Slaughter, G. T., "Ink Jet Printer/Copier", *IBM Technical Disclosure Bulletin*, vol. 21, No. 2, Jul. 1978, pp. 698-699.

*Primary Examiner*—Clifford C. Shaw
*Assistant Examiner*—Linda M. Peco
*Attorney, Agent, or Firm*—E. T. Barrett

[57] ABSTRACT

An ink jet printer in which a roll of paper is stored within an imaging drum and feeds through a longitudinal opening in the drum to the outside, passes around the drum, where it is held in place during the imaging process, and then ejected from the drum and cut off. While the imaged sheet is being ejected from the drum, the next length of paper is drawn from the interior of the drum and around the outside of the drum in position for the next imaging operation. The paper is withdrawn from the drum by a traction roller that engages only the center portion of the paper to prevent the paper from skewing because of unequal forces applied to the edge portions of the paper. The same traction roller is also used in a reverse mode to tension the paper around the drum.

13 Claims, 12 Drawing Figures

METHOD AND APPARATUS FOR TRANSPORTING AND TENSIONING SHEET MATERIALS IN AN INK JET PRINTER

BACKGROUND OF THE INVENTION

1. Field of the Invention

This invention relates to paper supply mechanisms of the type that are used with ink jet printers, facsimile machines, copiers and the like. More particularly it relates to an improvement in a roll feed mechanism in which the paper supply is stored within a drum, travels around the outer surface of the drum, where writing or imaging operations take place, and is then delivered from the drum.

2. Brief Description of the Prior Art

Many different arrangements have been used to handle paper and other sheet materials automatically in connection with drum type imaging devices. In some of these, cut sheets are fed individually from a supply stack, and in other feed systems, paper is fed from a continuous roll into the reproducing equipment and is cut into individual sheets either before or after the imaging operation. In another system, the paper supply is stored within an imaging drum and is withdrawn and wrapped around the drum for the imaging process.

Photocopier machines have used similar mechanisms to supply web in incremental replacement portions to the outside of a photocopier drum and then return the used web to a storage roll within the drum. Examples of such machines are shown in U.S. Pat. Nos. 4,097,138 to Kingsley; 4,102,570 to Shimoda; 4,231,652 to Moser and Wegmann; and 4,239,375 to Eisbein and Wegmann.

It is necessary in an ink jet printer that during the imaging process the sheet material be tensioned tightly around the imaging drum, because there is only a few thousandths of an inch clearance between the drum and the ejection orifice of the print head.

In systems where the used sheet material is returned to the interior of the imaging drum, the tensioning problem is not difficult and may be handled in a number of ways. However, when the sheet material is a processed image to be preserved, the free end remaining after severing the sheet material makes it difficult to tension the material around the drum for the ensuing imaging process.

U.S. Pat. No. 3,829,208 to van Meljel discloses a copy machine in which a supply of sensitized web material is stored on the axis of and within the drum and withdrawn around the outer surface of the drum. The web is utilized during the rotation of the drum to produce photocopies and when it is to be replaced by a fresh supply of web, the fresh web is drawn from within the drum and wrapped around the exterior while the used web is discarded away from the drum. The driving force for the web is provided by two pairs of rollers; a first pair carried by the drum, which engage the web only after it has passed around the exterior drum surface, and a second pair of rollers which are spaced from the drum and mounted in a fixed position relative to the rotation of the drum. Both pairs of rollers apply traction force across the entire width of the web. Tensioning of the web is provided by a roller mounted on an arm within the drum that is spring biased against the web in the space between the supply roll and the exit slot in the drum.

This arrangement provides a tension force that varies with the amount of web material remaining within the drum and limits the maximum capacity of the drum. None of the patents discloses a tension arrangement that is optimal for use with paper medium of the kind that is oridinarily used on ink jet printers. The drive mechanisms described in the above patents, although generally satisfactory for heavier web materials in the particular applications, are not generally suitable for ink jet printers and are likely to cause skewing of paper by the drive mechanism.

SUMMARY OF THE INVENTION

A roll of paper, or other sheet material, is stored on a supply spool mounted within an imaging drum. The paper feeds from the supply spool through a longitudinal opening in the drum to the outside, passes around the drum, where it is held in place during the imaging process, and then ejected from the drum to the desired length and cut off. While the imaged sheet is being ejected from the drum, the next length of paper is drawn from the interior of the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum. The paper is withdrawn from the drum by a traction roller that engages only the center portion of the paper to prevent the paper from skewing because of unequal forces applied to the edge portions of the paper. The same traction roller is also used in a reverse mode to retract and hold the paper around the drum during tensioning.

A printer of the kind in which this invention is embodied is described somewhat more fully in the copending application of Arthur Cleary and Calvin Winey Ser. No. 06/861,594 entitled "Method and Apparatus for Handling Sheet Materials" filed of even date herewith and assigned to the same assignee as the present invention. (Referred to herein as the "Cleary application".)

DESCRIPTION OF THE PREFERRED EMBODIMENT

Figure 1:
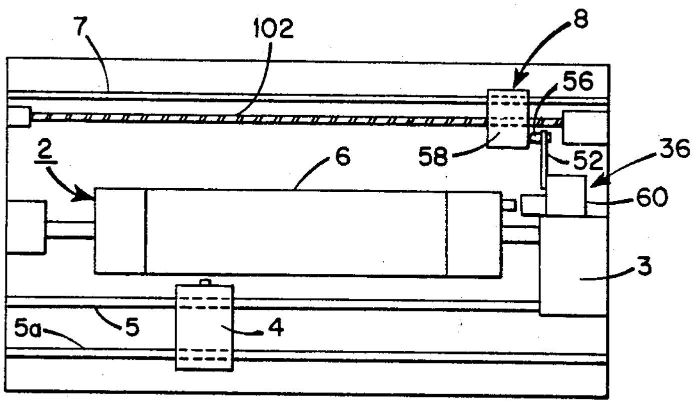
FIG. 1 is a diagrammatic top view of an ink jet printer embodying the invention.

As shown in FIG. 1, the ink jet printer includes a rotatable imaging drum, generally indicated at 2, that is driven by a stepping motor 3. An ink jet printing head assembly 4 is mounted for longitudinal movement along tracks 5 and 5*a*.

The imaging paper or other sheet material 6 envelopes the outer surface of the drum 2 during the imaging process and, at its conclusion, is ejected across a cutter bar 7 where it is sheared by a cutter mechanism, generally indicated at 8. The term "sheet material" as used in this application includes the various flexible media on which images can be recorded, such as paper, transparencies and photographic materials, which are supplied in long lengths. While the drum 2 rotates, the print head 4 moves longitudinally along the drum 2 tracing a spiral path on the paper 6 to produce the desired image. During the imaging process, it is necessary that the ejecting orifices of the print head 4 remain a fixed distance, in this example about 30 mils, from the surface of the paper. If the paper is not maintained snugly against the surface of the drum 2, poor imaging will result. As the completed image is ejected, a length of unused paper is simultaneously drawn from the interior of the drum 2 and positioned around the outside of the drum.

Figure 2:
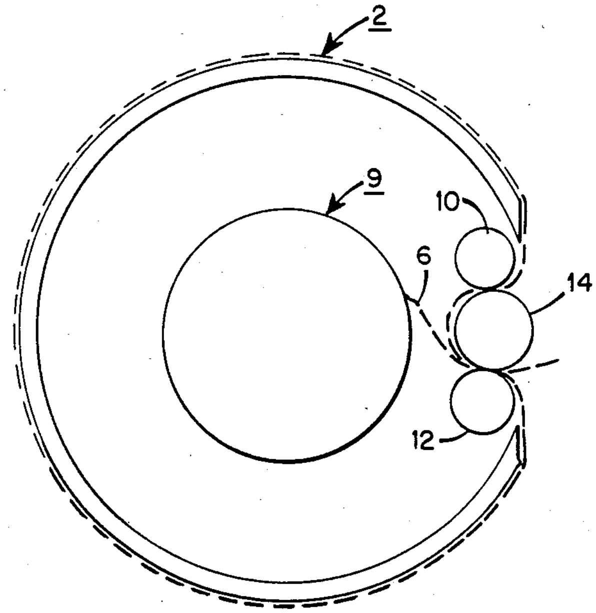
FIG. 2 is a diagrammatic illustration of the paper drive rollers.
Figure 3:
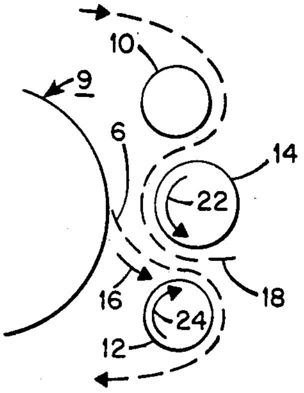
FIGS. 3 and 4 are diagrammatic views with the paper drive rollers separated for purposes of explanation.
Figure 4:
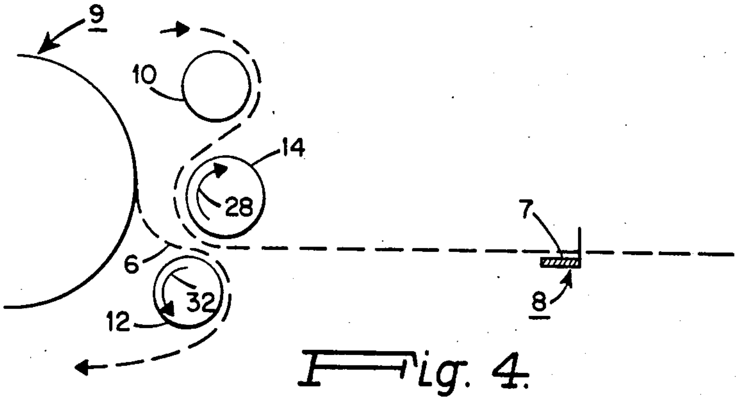

As illustrated diagrammatically in FIGS. 2, 3 and 4, the rotatable drum 2 supports within it a rotatably mounted spool, generally indicated at 9, that carries a roll of paper 6. The drum 2 also carries three rollers: an idler roller 10, a tension roller 12, and a drive roller 14. The path of the paper around and between these rollers is illustrated in FIGS. 3 and 4 where the rollers 10, 12 and 14 have been spaced apart only for the purpose of illustration.

The paper 6 from the spool 9 passes between the drive roller 14 and the tension roller 12, as illustrated by the arrow 16, partially around roller 12 and then around the outer circumference of the drum 2. After passing around the surface of the drum 2, the paper passes between the idler roller 10 and the drive roller 14, partially around the inner surface of the roller 14 and then between the rollers 12 and 14 where one surface of the paper engages the roller 14 and the other surface engages the length of paper already between the same pair of rollers. A short stub 18 (FIG. 3) of paper extends from between the rollers 12 and 14.

If the paper is allowed to remain without tensioning, the intermittent separation of the paper from the surface of the drum 2 will interfere with the proper functioning of the print head 4. As will be described later, the tension is produced by reverse rotation of the tensioning roller 12 while the drive roller 14 is locked in position. When the tensioning is complete, the rollers 12 and 14 are locked in position.

Figure 5:
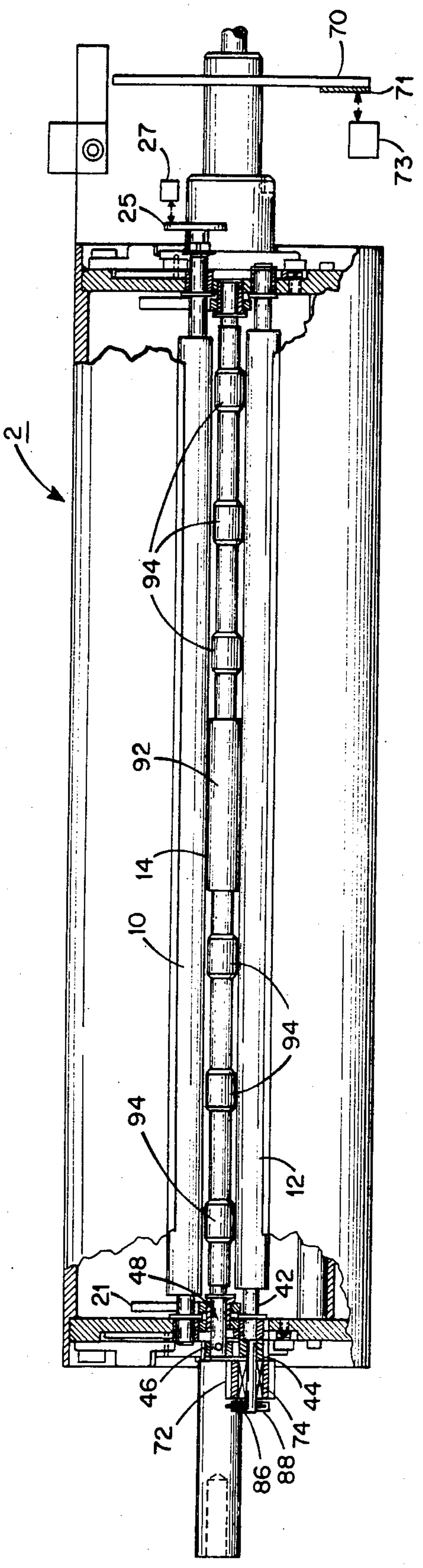
FIG. 5 is an elevational view of the imaging drum, partially cut away to show the interior construction.

The imaging process is then performed to produce an image on the surface of the paper 6 on the drum. When the imaging is completed, the drum is stopped at a predetermined rotary position and a drive mechanism, to be described later, is connected to the roller 12. To eject the imaged paper, the rollers 12 and 14 are driven in the directions indicated by the arrows 22 and 24 in FIG. 3. This action causes additional paper to be drawn from the spool 9 and travel around the drum while the rollers 12 and 14 eject the imaged paper. When a sufficient length of paper has been ejected, the imaged portion of the paper extends beyond the cutter mechanism 8 (FIG. 4), which may be located some distance from the drum 2. The length of the paper ejected may be measured by any appropriate mechanism such as by the rotation of a disk 25 (FIG. 5) that is secured to and rotates with the idler roller 10. The disk 25 has radial non-reflecting stripes that are detected and counted by an infrared detector 27. The paper is then sheared by the cutter mechanism 8 to separate the imaged portion. At this time, a length of paper extends from the drum 2 to the cutter bar 7. The drive mechanism is arranged to drive the rollers 12 and 14 in the directions indicated by the arrows 28 and 32 in FIG. 4. This action draws the paper back between the rollers 12 and 14, partially around the surface of roller 14, between roller 14 and the idler roller 10, around the outer surface of the drum 2, and again between the rollers 12 and 14 into the interior of the drum. This motion is continued until the paper is withdrawn to again leave the short stub 18 projecting from between rollers 13 and 14 as measured by reverse rotation of the disk 25.

As state above, during the imaging process, it is of critical importance that the paper 6 be in close contact with the surface of the drum 2. This is achieved by locking the roller 14 and driving the tensioning roller 12 in the direction indicated by the arrow 32 in FIG. 4. The driving surfaces of the rollers 12 and 14, which may be rubber, have relatively high friction so that when the roller 12 is driven in the reverse direction indicated by arrow 32, it tensions the paper around the drum by returning a short length of paper into the drum 2 while the paper 6 at the other end of the drum surface is restrained because of the surface friction of the locked drive roller 14. During this motion, the stub 18 is prevented from being withdrawn into the drum because the friction between the surface of the roller 14, which is locked, and the paper is substantially greater than the friction between the two adjacent surfaces of the paper.

During and subsequent to this tensioning process, the roller 12 is driven through a one-way clutch, to be described later, which permits rotation of the roller 12 only in the direction of the arrow 32 relative to the gear that drives this roller. Thus, when the tensioning action is complete and the drive is released from the roller 12, the paper remains under tension. The tensioning process is not controlled by the length of the paper withdrawn, but instead the tensioning roller 12 is merely allowed to operate for some prefixed period of time, for example, five seconds. Alternatively, a tension responsive switch can be used to disconnect the drive, but is more complicated and not as convenient as the timing procedure.

When the tensioning process has been completed, the drive mechanism is disconnected from the drum which is then rotated to produce the next imaging sequence. This arrangement permits an automatic continuing sequence of imaging processes.

FIGS. 5, and 8–12 illustrate a drive assembly, generally indicated at 36, (FIG. 9) for the rollers 12 and 14. The position of this drive assembly controls the three operating modes: the rest mode during which the drum 2 is free to rotate; the drive mode for ejecting and retracting the paper 6; and the tensioning mode when the paper is tensioned around the drum 2.

During the rest mode, the drive assembly 36 is disconnected from the roller 12 by moving the drive mechanism to its position farthest removed from the drum 2 leaving the drum free for rotation. This is illustrated by the diagrammatic representation of FIG. 8 in which the coupling is viewed from the front of the printer. In the driving mode, the drive assembly is moved to its position nearest the drum 2 and is arranged to drive rollers 12 and 14, mounted on shafts 42 and 48 respectively, (FIG. 5) by means of a spur gear 44, carried by the shaft 42, and a similar gear 46 carried by the shaft 48 of the drive roller 14.

In the tensioning mode, the drive assembly 36 is positioned at an intermediate station where it is arranged to drive the roller 12 while the roller 14 is locked against reverse rotaion by the drive assembly.

When the drum 2 is rotating, as during the imaging mode, the roller 12 is disconnected from the drive assembly 36 by a lever 52 (FIGS. 1 and 9–11) which is hinged at 54 on one end and carries a bumper 56 on the opposite end. The position of the lever 52 is controlled by the position of a housing 58 (FIG. 1) that carries the cutter mechanism 8.

Figure 8:
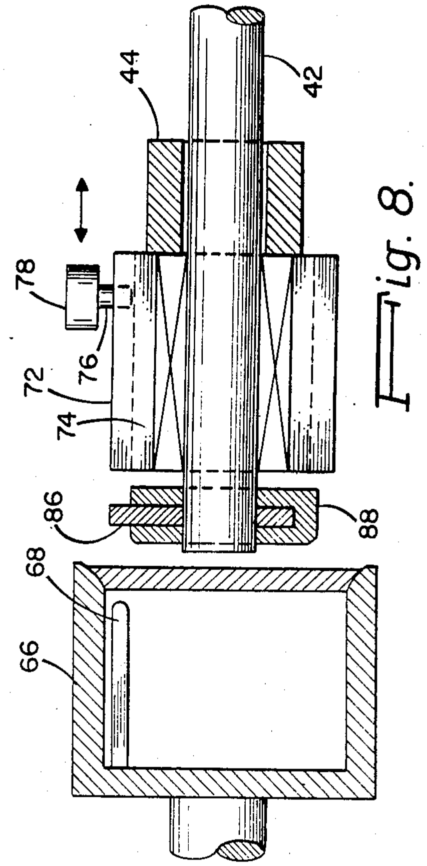
FIG. 8 is an enlarged diagrammatic sectional view of the drive coupling arrangement for illustrating its operation.
Figure 9:
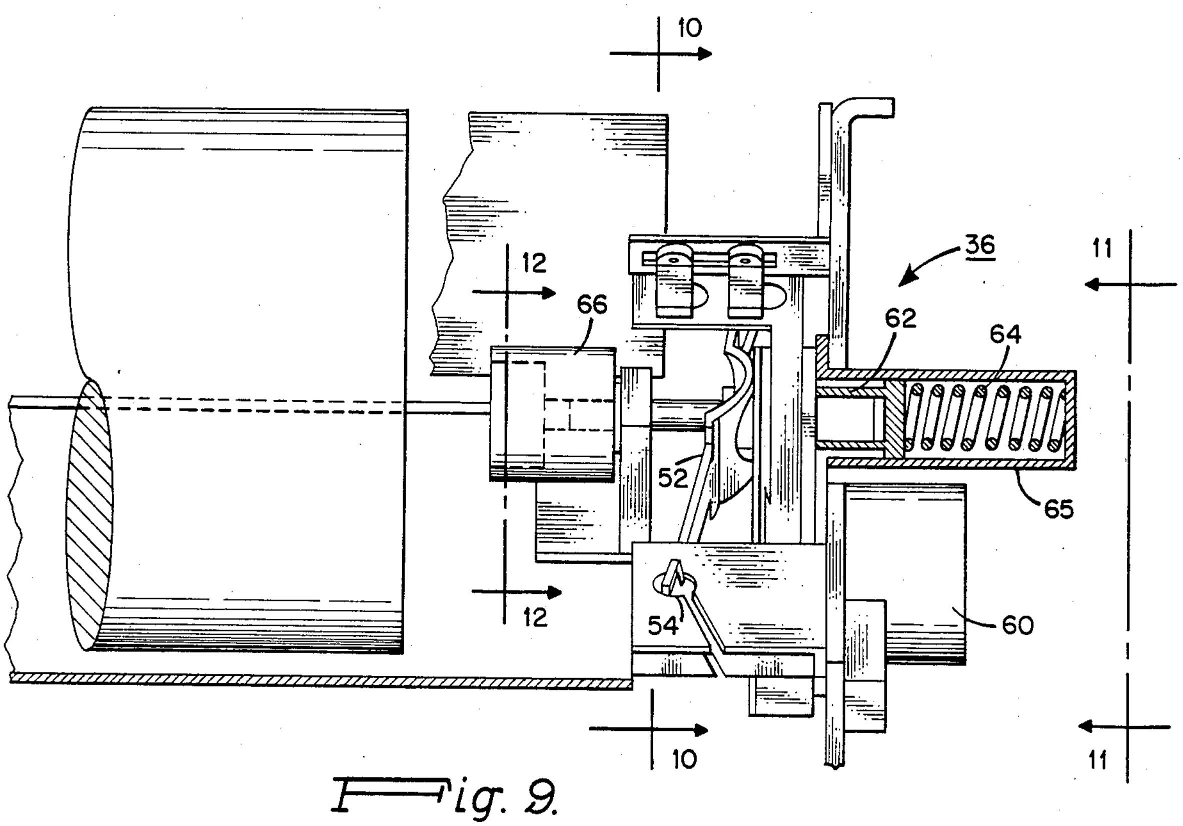
FIG. 9 is a partial sectional view showing the driving and control arrangement for the paper handling mechanism as viewed from the rear of the printer.
Figure 12:
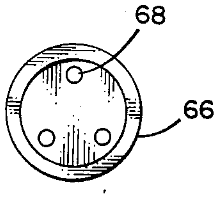
FIG. 12 is a partial sectional view along line 12—12 of FIG. 9.
Figure 10:
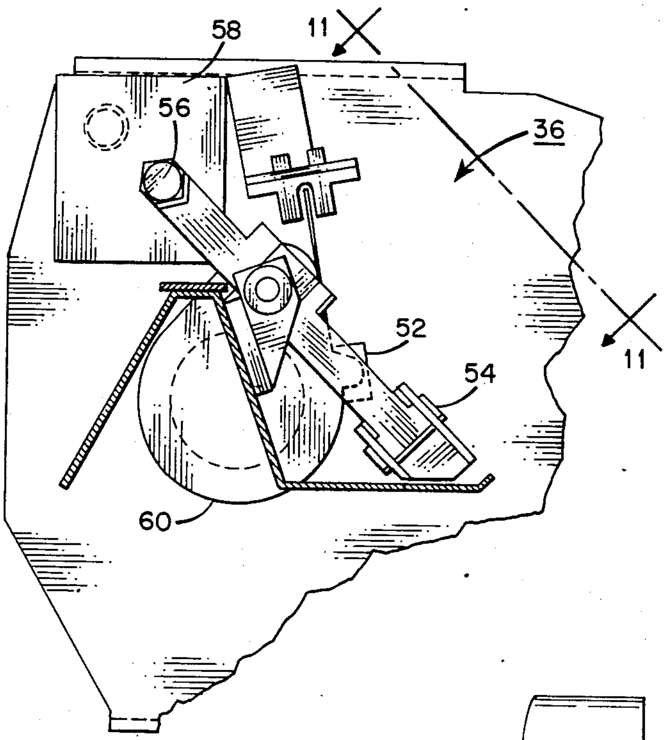
FIG. 10 is a partial view along line 10—10 of FIG. 9.
Figure 11:
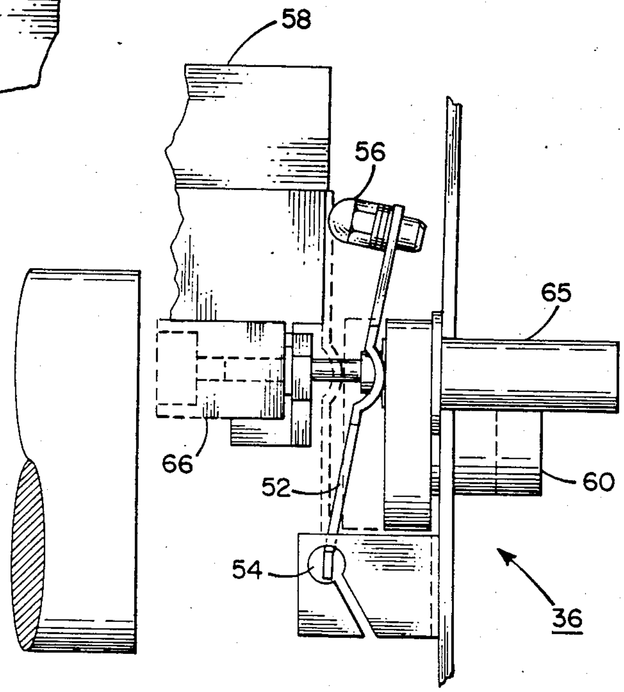
FIG. 11 is a view along line 11—11 of FIG. 10.

When the printer is in the imaging mode and the drum 2 is rotating, the lever 52 retains a motor 60 and its associated assembly in its rest position, far right as viewed in FIGS. 1 and 9. In this rest position, a plunger 62, controlled by the lever 52, maintains a spring 64 under maximum compression within a stationary mounting case 65. A drive sleeve 66 connected to the motor 60, and which contains three splines 68 (FIGS. 8 and 12) positioned circumferentially 120° apart within the sleeve 66, is spaced from the drum 2 leaving it free for rotation. The drum 2 is driven by the direct drive stepping motor 3 (FIG. 1) which by means of a central processor (not shown) stops the drum 2 at the end of the imaging cycle. The drum is then caused to rotate slowly until a radial mark 71, carried by a disk 70 (FIG. 5), which rotates with the drum 2, indicates through an infrared detector 73 that the drum 2 is in the correct position for coupling the drive 36 to the roller 12.

When the imaging operation is completed and the drum 2 has been stopped in its drive position, the housing 58 is moved to the position that causes the drive motor assembly 36 to be coupled to the tensioning roller 12 through the sleeve 66 to eject the imaged paper 6. In this position, the splines 68 engage the teeth of a spur gear 72 (FIGS. 5 and 8) that extends within the sleeve 66. The spur gear 44 is secured to gear 72 but is not secured to the shaft 42 other than through the gear 72. As shown in FIG. 8, a collar 88, that forms the end of the mechanism by which rollers 12 and 14 are driven, and the interior of the sleeve 66 are tapered so that the drive sleeve 66 is brought into engagement with the gear 72 in spite of slight variations in the rotary position of the drum 2. The gear 72 is secured to the shaft 42 that carries the roller 12 through a conventional one-way clutch 74 that permits rotation of the shaft 42 in the direction of the arrow 32 of FIG. 4 relative to the gear 72 but prevents relative rotation in the opposite direction.

Figure 6:
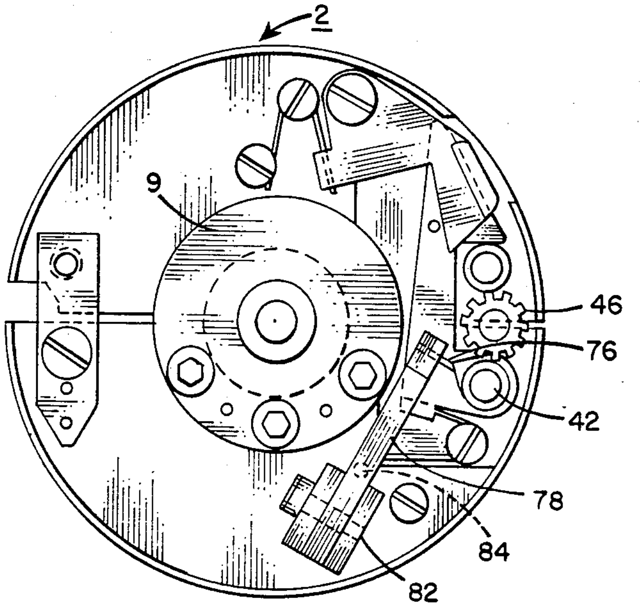
FIG. 6 is an end view of the imaging drum.
Figure 7:
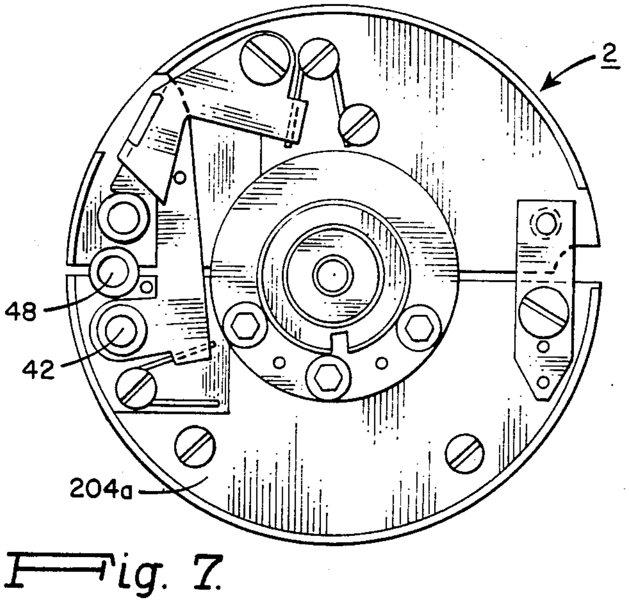
FIG. 7 is a view of the opposite end of the drum.

The gear 72 is normally locked from rotation by a pin 76 (FIGS. 6 and 8) carried in the end of an arm 78 and which extends into the space between adjacent teeth on the gear 72. The arm 78 is hinged at 82 and is biased toward the locking position by a coil spring 84 positioned between the end of the drum 2 and the arm 78. In the position when the gear 72 is engaged by the drive sleeve 66, the end of the sleeve 66 abuts the arm 78 and moves it toward the right, as viewed in FIG. 8, so that the pin 76 no longer engages the gear 72.

When the paper has been ejected to the desired length, as determined by a counter to be described, the drive motor 60 is stopped which prevents movement of the rollers 12 and 14 while the paper is sheared by the cutter mechanism 8.

After the paper has been sheared, the motor assembly 36, while in the drive position, is driven in the reverse direction, by reversing the motor 60, to withdraw the paper until only the short stub 18 projects from between the rollers 12 and 14. The housing 58 is then moved, against the force of the spring 64 (FIG. 9), to move the lever 52 and the motor assembly 36 to its intermediate or tensioning position. In this position, the end of the sleeve 66, which abuts the lever 78, has moved away from the drum 2 allowing the pin 76 (FIGS. 6 and 8), to lock the roller 14 by engaging the teeth of the gear 72, while the roller 12 is driven in the direction of the arrow 32 (FIG. 4). This is accomplished by a drive pin 86 (FIGS. 5 and 8) that extends through the collar 88 in the end of the shaft 42 of the roller 12. One of the splines 68 in the drive sleeve 66 engages the drive pin 86, but not the teeth of gear 72, while the gear 72, and thereby the gears 44 and 46 and the roller 14, are locked by the locking pin 76. In this state, while the gear 72 is locked, shaft 42 is free to rotate in the direction of arrow 32 of FIG. 4 because of the one-way clutch 74.

The shaft 48 of the drive roller 14 is rotatably supported on the drum 2 by any suitable means such as that described in the Cleary application. Only the center portion of the shaft 48 is covered with a resilient sleeve 92, for example about two inches in length, that engages the rollers 10 and 12. This arrangement applies driving force to the paper only along the center strip of the paper and prevents the skewing that would occur if the driving forces were applied across the width of the paper. The contour of the paper on each side of the sleeve 92 is controlled by a series of spaced plastic bushings 94 which are smaller in diameter than the sleeve 92. The bushings 94, which have non-traction surfaces, do not touch, or may touch very lightly, the surface of the tension roller 12

The shaft 42 of the tensioning roller 12 is supported by the drum 2 in any suitable manner such as that described in the Cleary application. This roller is similar in construction to the idler roller 10 and carries a resilient sleeve that extends most of the distance along the shaft 42 and substantially spans the width of the imaging paper.

Other essential parts of a printer of this kind, such as the construction of the cutter mechanism 8, the imaging drum 2, and the central processor unit that controls the sequence of operations, and the like are described more fully in the Cleary application.

We claim:

1. In an image forming device, apparatus comprising a drum, first drive means for rotating said drum, sheet material positioned within said drum and extending from the interior of said drum around the outside surface, image forming means for producing an image on said sheet material while said drum is rotating, positioning means for stopping said drum in a predetermined position, first and second rollers carried by said drum, said sheet material extending from within said drum between said rollers, around the outer surface of said drum and thence again between said rollers and between said second roller and said sheet material, second drive means, and means coupling said second drive means to said rollers when said drum is in said predetermined position having a first operating condition driving said first and second rollers in a forward direction thereby to cause said sheet material to be withdrawn from said drum and follow a path around the exterior of said drum and thence away from said drum, and a second operating condition locking said second roller and driving said first roller in a reverse direction thereby to tension said sheet material around the outside of said drum.

2. Apparatus as claimed in claim 1 wherein said means coupling said second drive means to said rollers includes a drive element, a one-way clutch coupling said drive element to said first roller, means coupling said drive element to said second roller, and means responsive to said second operating condition to lock said drive element from rotation.

3. Apparatus as claimed in claim 2 wherein said drive element is a first spur gear.

4. Apparatus as claimed in claim 3 wherein said means coupling said drive element to said second roller includes a second spur gear carried by said second roller and driven by said first spur gear.

5. Apparatus as claimed in claim 2 including a coupling which in said second operating condition forms a driving connection between said first roller and said second drive means independent of said drive element.

6. Apparatus as claimed in claim 1 wherein said second roller has a traction surface only in the center portion thereof.

7. Apparatus as claimed in claim 6 wherein said traction surface has a length of about two inches.

8. Apparatus as claimed in claim 6 including a plurality of spaced guide bushings positioned on each side of said traction surface.

9. Apparatus as claimed in claim 8 wherein said guide bushings are smaller in diameter than said traction surface.

10. Apparatus as claimed in claim 9 wherein said guide bushings have non-traction surfaces.

11. Apparatus as claimed in claim 10 wherein said bushings are formed of plastic.

12. In an ink jet printer of the type having an imaging drum, means for rotating said drum, a supply of sheet material within said drum, and a print head for scanning the surface of said drum, means for transporting said sheet material and tensioning it around said drum including first, second and third rollers carried by said drum, said sheet material extending between said first and second rollers and between said second and third rollers, transport drive means driving said first roller in a reverse direction to propel said sheet material toward said drum, and means locking said second roller against rotation while said first roller is driven in said reverse direction thereby to tension said sheet material around said drum.

13. Transporting means as claimed in claim 12 including timing means for stopping said transport means after a predetermined period of operation.

* * * * *